United States Patent [19]
Russell et al.

[11] Patent Number: 5,353,310
[45] Date of Patent: Oct. 4, 1994

[54] DATA TRANSMISSION SYSTEM WITH REDUCED ERROR PROPAGATION

[75] Inventors: Mark A. Russell; Johannes W. M. Bergmans; Antonius J. P. Bogers; Eric Kathmann, all of Eindhoven, Netherlands

[73] Assignee: U.S. Philips Corporation, New York, N.Y.

[21] Appl. No.: 971,380

[22] Filed: Nov. 4, 1992

[30] Foreign Application Priority Data

Dec. 11, 1991 [EP] European Pat. Off. ........ 91203256.2

[51] Int. Cl.$^5$ ............... H03D 1/06; H03D 11/04; H03K 5/01; H03K 6/04; H04B 1/10; H04L 1/00; H04L 25/08
[52] U.S. Cl. ........................... 375/101; 375/14; 375/99; 364/724.2
[58] Field of Search .................. 375/11, 12, 14, 99, 375/101; 364/724.19, 724.2

[56] References Cited

U.S. PATENT DOCUMENTS

| | | | |
|---|---|---|---|
| 4,870,657 | 9/1989 | Bergmans et al. | 375/99 X |
| 4,905,254 | 2/1990 | Bergmans | 375/101 X |
| 4,953,183 | 8/1990 | Bergmans et al. | 375/101 |

OTHER PUBLICATIONS

Bergmans et al., "Partial-Response Decoding of Rate ½ Modulation Code for Digital Storage," IEEE. Trans. on Communications, vol. 39, No. 11 Nov. 1991 pp. 1569-1581.
Forney et al., "Combined Equalization and Coding Using Precoding", IEEE Communications Magazine (Dec. 1991) pp. 25-34.
Holte et al., "A New Digital Echo Canceler for Two--Wire Subscriber Lines", IEEE Trans. Com., vol. COM-29, No. 11, Nov. 1981 pp. 1573-1580.
Messerschmitt, "Generalized Partial Response for Equalized Channels with Rational Spectra", IEEE Trans. Comm., vol. Comm.-23, No. 11, Nov. 1975 pp. 1251-1258.
Kobayashi, "On Decoding of Correlative Level Coding Systems with Ambiguity Zone Detection", IEEE Trans. Comm., vol. Com-19, No. 4, Aug. 1971.

Primary Examiner—Stephen Chin
Assistant Examiner—Bryan Webster
Attorney, Agent, or Firm—Anne E. Barschall

[57] ABSTRACT

For avoiding error propagation as a result of decision feedback equalization, the data to be transmitted are coded with a coder 2 which has a transfer function substantially inverse to the transfer function of the channel 4. Consequently, instantaneous decisions about the received symbol may be made at the receiver 6 without intersymbol interference causing a disturbance. If the channel transfer function differs from the transfer function of the precoder 2, intersymbol interference will again occur, so that the symbol error rate will increase. In order to restrict this increase of the symbol error rate as much as possible, the receiver comprises a cascaded circuit of an adaptive filter 18 which has an inverse transfer function to that of the channel and a decoder 21 which has an inverse transfer function to that of the precoder 2.

7 Claims, 4 Drawing Sheets

DATA TRANSMISSION SYSTEM WITH REDUCED ERROR PROPAGATION

The invention relates to a transmission system for transmitting data symbols from a source to a destination, comprising a transmitter coupled to a channel which transmitter includes coding means for converting input symbols into channel symbols; a receiver coupled to an output of the channel which receiver includes subtracter means for determining a difference signal between a channel output signal and a feedback signal, quantizing means for obtaining a quantized difference signal, filter means for deriving the feedback signal and a feed-forward signal from the quantized difference signal, and decoding means for detecting the output symbols in the difference signal and the feed-forward signal.

The invention likewise relates to a receiver to be used in a system mentioned above.

A system of this type is known from the journal article entitled "On Decoding of Correlative Level Coding Systems with Ambiguity Zone Detection" de H. Kobayashi and T. D. Tang in IEEE Transactions on Communication Technology, Vol. COM-19, Nr. 4, August 1971.

Such transmission systems may be used, for example, for transmitting data signals over the public telephone network or for reconstructing data signals coming from a magnetic tape or disc.

When data symbols are transmitted via a transmission medium or stored on a recording medium respectively, the data symbols to be transmitted or recorded are converted into analog pulses successively fed to the transmission medium or recording medium respectively, referred to herein as "channel".

Generally, there is provided that the analog pulses do not overlap in time. If the channel has a limited bandwidth, the pulses will start to overlap, which will often lead to the fact that a signal received at a specific moment does not only depend on a single data symbol, but also on data symbols adjacent in time. This effect is called intersymbol interference.

Intersymbol interference may be caused not only by a limited bandwidth of the channel, but also by the use of a band limiting filter at the transmitter end, which is used for giving the frequency spectrum of the transmitted and recorded analog pulses respectively, a desired shape. The presence of intersymbol interference will often lead to an increased symbol error rate.

A possibility of limiting the increase of the symbol error rate caused by intersymbol interference is the use of an adaptive or non-adaptive intersymbol interference equalizer. This equalizer may have the form of a filter which has a transfer function that is inverse to the channel transfer function. By cascading this filter with the channel, a more or less flat transfer characteristic is obtained, so that the intersymbol interference will disappear. However, a problem may then be that the filter considerably increases the noise already available.

Another possibility of reducing intersymbol interference is the use of a decision feedback intersymbol interference equalizer. In this equalizer an equalization signal is subtracted from the received detection signal on the basis of decisions made about already received data symbols. This equalization signal is an estimate of lagging intersymbol interference belonging to the received data symbol. Because the equalization signal is determined on the basis of a decision about the value of a received data symbol, which decision may be erroneous, it is true, but does not add any further noise, there will be no noise increase.

A drawback of the use of a decision feedback intersymbol interference equalizer is that an erroneous symbol detection, for example, as a result of noise, leads to an erroneous equalization signal as a result of which the intersymbol interference cannot be fully equalized or may sometimes even be increased. This may lead to an erroneous detection of the next symbol, so that the equalization signal may be erroneous again. The phenomenon described hereinbefore is denoted error propagation.

In the known system, error propagation is avoided by performing the equalization not in the receiver but in the transmitter. For that matter, the symbols to be transmitted are known with certainty in the transmitter, so that the equalization signal will certainly have the correct value. Equalization is then effected by way of coding means which convert the source symbols into (pre-equalized) channel symbols. To this end, the coding means are to have a transfer function that is inverse to the transfer function of the channel. The coding means transfer function may be linear or nonlinear. The input signal of the receiver then no longer exhibits any intersymbol interference at all, so that a memoryless detector may be used for determining the value of the received symbol.

Aforementioned journal article describes a receiver in which a memoryless detector is used which is constituted by a combination of a filter and a decoder. The filter comprises subtracter means which determine the difference between an input signal and a feedback signal. This feedback signal is determined on the basis of the subtracter means output signal by the use of a series combination of quantizing means and filter means. The filter means are selected such that the transfer function of the filter is inverse to the transfer function of the channel. Decoding means determine the final estimate of the received symbol on the basis of the subtracter means output signal and a feed-forward signal which is equal to the feedback signal.

The decoding means, combined with the filter means, have a transfer function that is inverse to the transfer function of the coding means in the transmitter. The coding means in the transmitter have a transfer function which is inverse to the transfer function of the channel. Consequently, the transfer function of the combination of decoding means and filter means corresponds to the transfer function of the channel. The detector may thus be considered a cascaded combination of two elements which have mutually inverse transfer functions, so that ultimately a memoryless detector is obtained.

In the known detector such a structure is preferred to a simpler memoryless detector, because the output signal of the subtracter means may be used for obtaining a measure of reliability of the received symbol. The output signal of the subtracter means is to have a value belonging to one of the possible values of the input signal of the channel. The more the output signal of the subtracter means differs from one of the possible values, the greater the probability is that this input signal will lead to an erroneous decision about the value of the received symbol. In the known detector the output signal of the subtracter means is considered "unreliable" and discarded for the decision about the value of the received symbol if the difference between the output signal of the subtracter means and one of the possible values exceeds a specific value.

A problem for the known transmission system is that in the case of a deviation of the transfer function of the channel from the nominal value i.e. the value on the basis of which the coding means, the filter means, and the decoding means have been dimensioned, the symbol error rate increases. Such deviations of the transmission channel transfer function frequently occur in practice. Examples of this are changing properties of transmission cables under the influence of temperature variations and differences between the properties of magnetic information carriers made by different manufacturers.

It is an object of the invention to provide a transmission system as defined in the opening paragraph, in which the increase of the symbol error rate as a result of a deviation of the channel transfer function relative to the nominal value is reduced.

For this purpose, the invention is characterized, in that the filter means comprise a first filter for determining the feedback signal and a second filter, differing from the first filter, for determining the forward signal and in that the first filter is a channel-adaptive filter.

By rendering the filter means that generate the feedback signal adaptive, it is possible for the transfer function of the combination of subtracter means and feedback filter to remain the inverse function of the channel transfer function even if the channel transfer function changes. Simulations have shown that in a system according to the invention the error rate increase as a function of the channel transfer function deviation is smaller than in the state of the art system.

An embodiment of the invention is characterized, in that the number of possible values of the channel symbols is equal to the number of possible values of the source symbols. If the number of possible values M of the source symbols and the number of possible values of the channel symbols are equal, this will result in a simple realization of the transmission system. Despite this boundary condition being imposed, it appears that for most channels there are suitable coding means which very well approach the inverse channel transfer function. The choice of suitable coding means is known from the journal article entitled "Generalized Partial Response for Equalized Channels with Rational Spectra" by D. G. Messerschmitt in IEEE Transactions on Communications, Vol. COM-23, N° 11, November 1975.

It should be observed that the invention may also be applied to coded modulation systems which employ precoding such as described in the journal article entitled "Combined Equalisation and Coding using Precoding" by G. D. Forney and M. V. Eyuboglu in IEEE Communication Magazine, December 1991.

The advantage of the invention of the receiver being capable of adjusting itself to a varying transfer function of the channel can also be obtained there too.

A further embodiment of the invention is characterized, in that the receiver comprises further quantizing means for obtaining a further difference signal quantized to different values, M being equal to the number of different values of the channel symbols, the decoding means also being arranged for determining the destination symbols on the basis of the further quantized difference signal and on the basis of the feed-forward signal.

By quantizing the difference signal before applying same to the decoding means, the signals in the decoding means may only adopt a limited number of values, so that the complexity of the decoding means may be reduced. The number of necessary levels of the further quantizing means depends on the possible nominal values of the received signal and the possible nominal values of the output signal of the adaptive filter means.

A further embodiment of the invention is characterized, in that the decoding means comprise modulo-M adder means for obtaining the destination symbols from the modulo-M addition of a signal that is a measure for the difference signal and a signal that is a measure for the feed-forward signal.

The use of modulo-M addition for obtaining the destination symbols leads to a further simplification of the decoding means.

The invention will be further explained hereinbelow with reference to the drawing figures in which.

Figure 1:
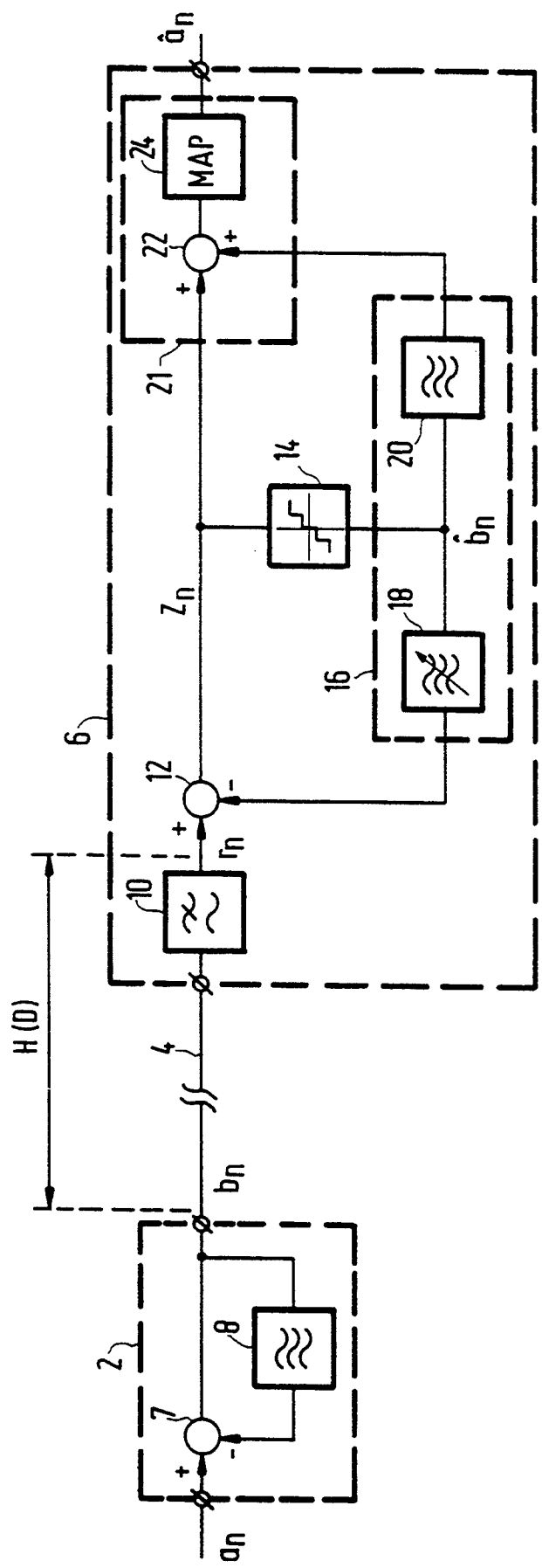
FIG. 1 shows a general block diagram of a transmission system according to the invention.

In the transmission system as shown in FIG. 1 the input symbols to be transmitted $a_n$ are applied to the input of the coding means 2. These coding means comprise a modulo-M subtracter 7, with an output signal $b_n$, and a filter 8. The input signal of the coding means is applied to a first input of the modulo-M subtracter 7. The output of the modulo-M subtracter 7 forms the output of the coding means. The output of the modulo-M subtracter 7 is furthermore connected to an input of the filter 8. The output of the filter 8 is connected to a second input of the modulo-M subtracter 7.

The output of the coding means 2 is connected to a transmission medium 4. The output of the transmission medium 4 is connected to the input of the receiver 6.

In the receiver 6 the input of the receiver is connected to the input of a filter 10. The combination of the transmission medium 4 and the filter 10 forms the channel having the transfer function H(D). The output of the filter 10, with output signal $r_n$, is connected to a first input of the subtracter means 12. The output of the subtracter means 12, with output signal $z_n$, is connected to an input of decoding means 21 and an input of quantizing means 14. The output of the quantizing means 14, with output signal $\hat{b}$, is connected to the input of the filter means, in this case constituted by a first filter 18 and a second filter 20. The output of the filter 20 is connected to a second input of the subtracter means 12. The output of the filter 20 is connected to a further input of the decoding means 21. The two inputs of the decoding means 21 are connected to inputs of adder means 22. The output of the adder means is connected to an input of mapping means. The output of the mapping means forms the output of the receiver.

In the coding means 2 the source symbols $a_n$ are converted into the channel symbols $b_n$. The transfer function of the coding means 2 is chosen, so that this is an estimate of the inverse channel transfer function. If the channel transfer function is equal to H(D), the transfer function of the filter 8 is an estimate of H(D) - 1. Here D, as is customary in the literature relating to digital transmission, represents a delay operation over a single symbol period.

Since the coding means 2 have provided that the input signal of the subtracter means 12 nominally solely depends on a single source signal $a_n$, the decision about the value of the transmitted symbol may be made by a memoryless detector. If the channel transfer function is equal to the nominal value, the combination of filter and decoder acts as such a memoryless system. The output of the adder means 22 then presents a proper estimate of the signal $a_n$. Final decisions about the value of the symbols $a_n$, are then made by the mapping means which may here be constituted by a quantizer.

If the channel transfer function now deviates from the coding means transfer function, the input signal of the subtracter means will depend on more than one $a_n$, so that the symbol error rate will increase.

Simulations have shown that by rendering the filter 18 adaptive to the channel transfer function in accordance with the inventive idea, this increase of the symbol error rate will be restricted.

This is caused by the fact that, when an adaptive filter 18 is used, the transfer function remains substantially independent of the channel properties from the input of the coding means to the output of the adder circuit 22.

Figure 2:
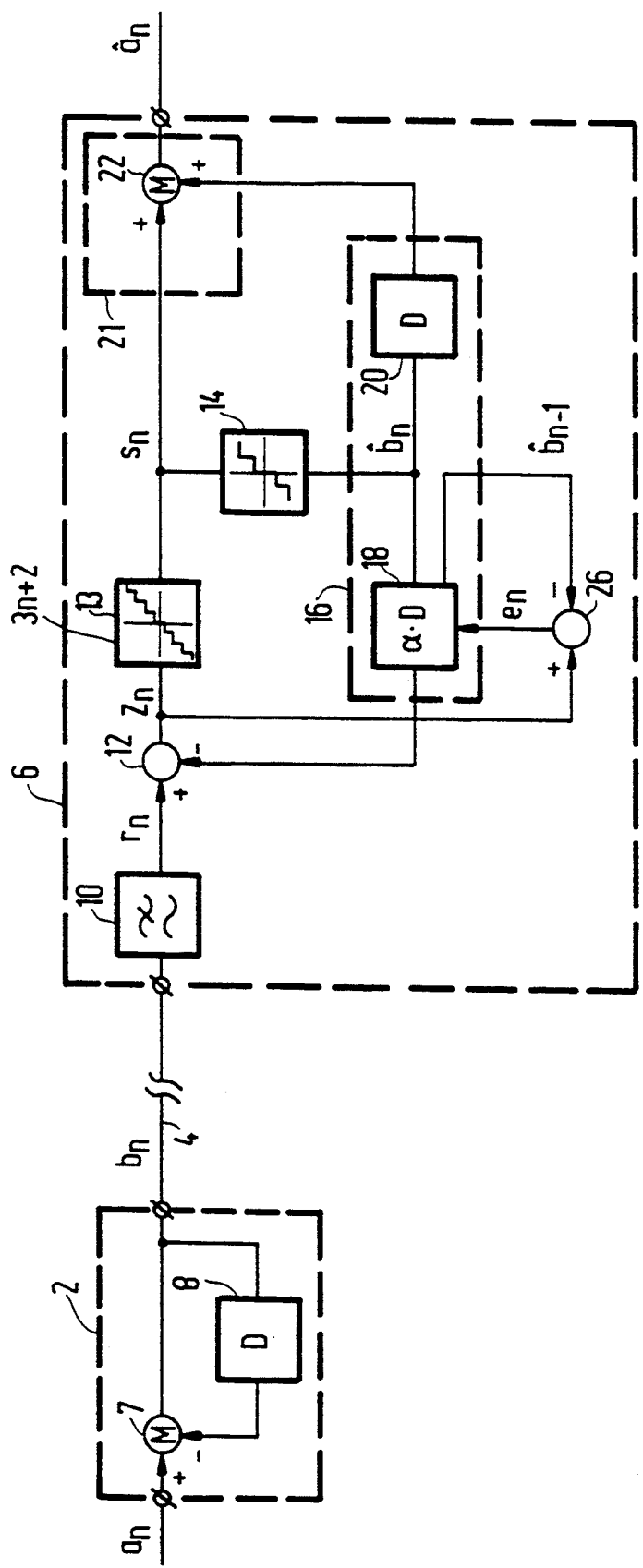
FIG. 2 shows a block diagram of a transmission system according to the invention, in which the line codes are obtained from the source symbols by means of what is commonly referred to as partial response filtering.

In the transmission system as shown in FIG. 2 the input of the coding means 2, with input symbols $a_n$, is connected to an input of a modulo-M subtracter 7. The output of the modulo-M subtracter 7 is connected to the input of the channel 4 and to an input of a delay element 8. The output of the delay element 8 is connected to a second input of the modulo-M subtracter 7.

The output of the channel 4 is connected to an input of a receiver filter 10. The output of the receiver filter 10 is connected to the input of the subtracter means 12. The output of the subtracter means 12 is connected to an input of a further quantizing means 13 and an input of further subtracter means 26. The output of the further quantizing means 13 is connected to an input of the quantizing means 14 and to an input of modulo-M adder means 22. The output of the quantizing means 14 is connected to the input of the filter means 16, in this case an adaptive first filter having a transfer function a·D and a second filter constituted by delay element 20 having a transfer function D. The output of the quantizing means 14 is additionally connected to a second input of the further subtracter means 26. The output of the adaptive filter 18 is connected to a further input of the subtracter means 12. The output of the further subtracter means 26 is connected to a control input of the adaptive filter 18. The output of the delay element 20 is connected to a further input of modulo-M adder means 22.

The coding means 2 and the decoding means 22 are based on modulo-M additions and subtractions. The number of possible values of the input signals as well as the number of possible values of the output signal are here equal to M. For example, if M is assumed to be equal to 4 and the two operands of the modulo-M operation may adopt the values 0, 1, 2 and 3, the modulo-m addition and subtraction of two operands a and b are defined as is represented in the Table below:

| a | b | a + b | a − b |
|---|---|-------|-------|
| 0 | 0 | 0 | 0 |

-continued

| a | b | a + b | a − b |
|---|---|-------|-------|
| 0 | 1 | 1 | 3 |
| 0 | 2 | 2 | 2 |
| 0 | 3 | 3 | 1 |
| 1 | 0 | 1 | 1 |
| 1 | 1 | 2 | 0 |
| 1 | 2 | 3 | 3 |
| 1 | 3 | 0 | 2 |
| 2 | 0 | 2 | 2 |
| 2 | 1 | 3 | 1 |
| 2 | 2 | 0 | 0 |
| 2 | 3 | 1 | 3 |
| 3 | 0 | 3 | 3 |
| 3 | 1 | 0 | 2 |
| 3 | 2 | 1 | 1 |
| 3 | 3 | 2 | 0 |

The channel symbols $b_n$ may adopt for the M-level alphabet one of the values $0, 1, 2, \ldots, M-2, M-1$. The signal $r_n$ (noise discarded) may become equal to one of the values $0, 1, 2, \ldots, 2 \cdot M - 2$, for nominal channel transfer function $1+D$, which corresponds to $2 \cdot M - 1$ different values. The feedback signal $\hat{b}_n$ which is equal to $r_n - \hat{b}_n$ may then adopt the values $-(M-1)$, $-(M-2), \ldots, 2 \cdot M - 2$. This corresponds to $3 \cdot M - 1$ different values.

If $a_n$ and $b_n$ are assumed to have the symbol values 0, 1, 2 and 3, the signal $z_n$ may adopt the value of $-3, -2, -1, 0, 1, 2, 3, 4, 5$ or $6$. As a result of noise and other disturbing signals the value of $z_n$ may deviate from aforesaid values. The quantizing means 13 then provide an output signal that has again one of aforesaid values. The quantizing means 14 provide that the symbol $\hat{b}_n$ is always equal to one of the values 0, 1, 2 or 3. The relation between the input signal $V_i$ and output signal $V_u$ of the quantizing means 13 and of the quantizing means 14 with aforesaid possible values of the symbols $a_n$ and $b_n$ is given by the following Table:

| $V_i$ | $V_u$ quant. 13 | $V_u$ quant. 14 |
|-------|-----------------|-----------------|
| $V_i < -2.5$ | −3 | 0 |
| $-2.5 \leq V_i < -1.5$ | −2 | 0 |
| $-1.5 \leq V_i < -0.5$ | −1 | 0 |
| $-0.5 \leq V_i < 0.5$ | 0 | 0 |
| $0.5 \leq V_i < 1.5$ | 1 | 1 |
| $1.5 \leq V_i < 2.5$ | 2 | 2 |
| $2.5 \leq V_i < 3.5$ | 3 | 3 |
| $3.5 \leq V_i < 4.5$ | 4 | 3 |
| $4.5 \leq V_i < 5.5$ | 5 | 3 |
| $V_i \geq 5.5$ | 6 | 3 |

By means of modulo-M (M=4) addition of the symbol values $s_n$ and $\hat{b}_n$, the decisions $\hat{a}_n$ about the transmitted symbols $a_n$ are finally obtained. Alternatively, it is possible, as has already appeared from the embodiment shown in FIG. 1, to include the quantizing means 13 in the decoding means 21. The module-M adder circuit 22 is then to be replaced by an ordinary adder circuit with mapping means inserted down-stream of this adder circuit, which mapping means perform a modulo-M operation in addition to the quantization. The transfer of such an element will be given in the Table below for M=4.

| $s_n + \hat{b}_{n-1}$ | $\hat{a}_n$ |
|------------------------|-------------|
| $V_i < 0.5$ | 0 |
| $0.5 \leq V_i < 1.5$ | 1 |
| $1.5 \leq V_i < 2.5$ | 2 |

-continued

| $s_n + \hat{b}_{n-1}$ | $\hat{a}_n$ |
| --- | --- |
| $2.5 \leq V_i < 3.5$ | 3 |
| $3.5 \leq V_i < 4.5$ | 0 |
| $4.5 \leq V_i \leq 5.5$ | 1 |
| $V_i > 5.5$ | 2 |

As already observed hereinbefore, the filter means according to the inventive idea comprise an adaptive filter which adapts its transfer function to that of the channel. For this purpose the subtractor means 26 generate an error signal $e_n$ which is equal to $z_n - \hat{b}_n$. The adaptation algorithm adapts $\alpha$ so that the mean value of the power of the error signal $e_n$ is minimized. For this purpose, various adaptation algorithms may be used. One of these adaptation algorithms is the so-called LMS algorithm. According to this algorithm at is adapted as follows:

$$a_n = a_{n-1} + \lambda \cdot e_n \cdot \hat{b}_{n-1} \tag{1}$$

Herein $\lambda$ is the adaptation constant of the LMS algorithm. A further embodiment of the adaptive filter 18 is the use of a so-called Table filter. Table filters are known from the journal article entitled "A New Digital Echo Canceller for Two-Wire Subscriber Lines" by Nils Holte and Steinar Stueflotten in IEEE Transactions on Communications, Vol. COM-29, No. 11, November 1981.

Figure 3:
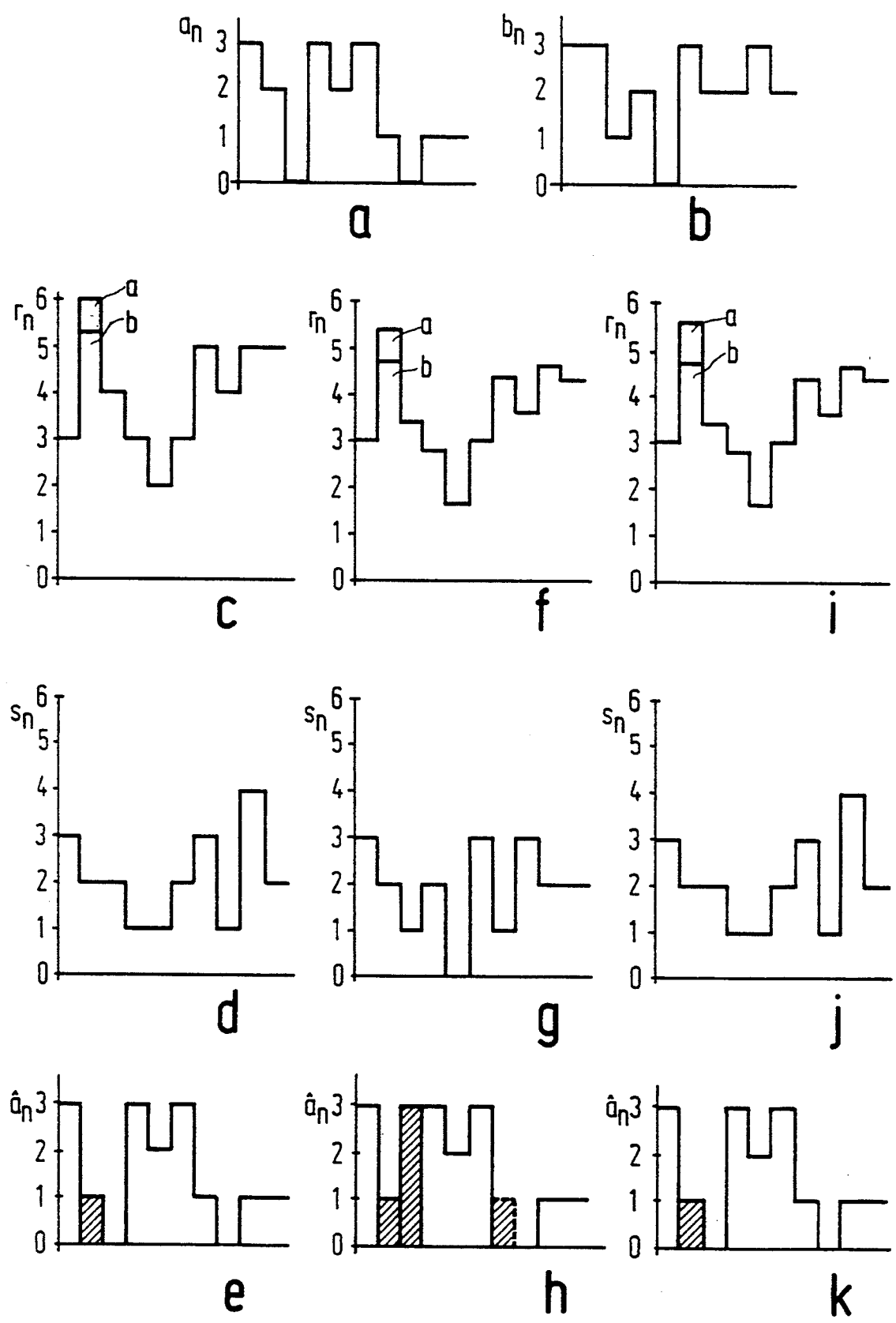
FIGS. 3a–3k shows signal shapes as they may occur in a state-of-the-art system and in a system according to the invention.

FIG. 3 shows the values of a number of symbols and a number of signals as they occur in the transmission system as shown in FIG. 2 plotted against time.

FIG. 3-a shows a series of values of the symbol to be transmitted $a_n$. FIG. 3-b shows the series of values of the symbol $b_n$ that has been obtained from the symbol $a_n$ and the symbol $b_{n-1}$ by means of modulo-4 addition.

FIGS. 3-c, 3-d and 3e show signal shapes and symbol values for the situation in which the channel transfer function is nominal. This transfer function H(D) of the channel is then equal to 1+D. The receiver may be arranged according to the state of the art or according to the invention. In FIG. 3-c the curve a shows the value of the signal $r_n$ if the channel does not add any further noise or other disturbing signals. Curve b shows the value of the signal $r_n$ if noise or other disturbing signals are indeed added by the channel.

FIG. 3-d shows the variation of the signal $s_n$, while FIG. 3-e shows the estimate $\hat{a}_n$ of the symbol $a_n$ plotted against time. From FIG. 3e it is apparent that one erroneous estimate of the symbol $a_n$ is made in the interval shown, as a result of disturbing signals in the signal $r_n$. This symbol is shaded in FIG. 3-e.

FIGS. 3-f, 3-g and 3-h represent the same signals and symbol values as the respective FIGS. 3-c, 3-d and 3-e, but then for the situation in which the transfer function of the channel is equal to 1+0.8D and that the receiver is arranged according to the state of the art with a fixed filter 18 having a transfer function D.

From FIG. 3-h it follows that an erroneous estimate of the symbol $\hat{a}_n$ is caused one time by disturbing signals and that an erroneous estimate of the symbol $\hat{a}_n$ is made twice as a result of intersymbol interference, so that in the interval shown an erroneous estimate of the symbol $a_n$ occurs three times.

FIGS. 3-f, 3-g and 3-h represent the same signals and symbol values as the respective FIGS. 3-c, 3-d and 3-e, but then for the situation in which the receiver is arranged according to the invention with an adaptive filter 18 having a transfer function 0.8D. FIG. 3-k now shows that there is only a single erroneous symbol detection in the interval shown, so that the use of the receiver according to the invention actually results in a lower symbol error rate.

Figure 4:
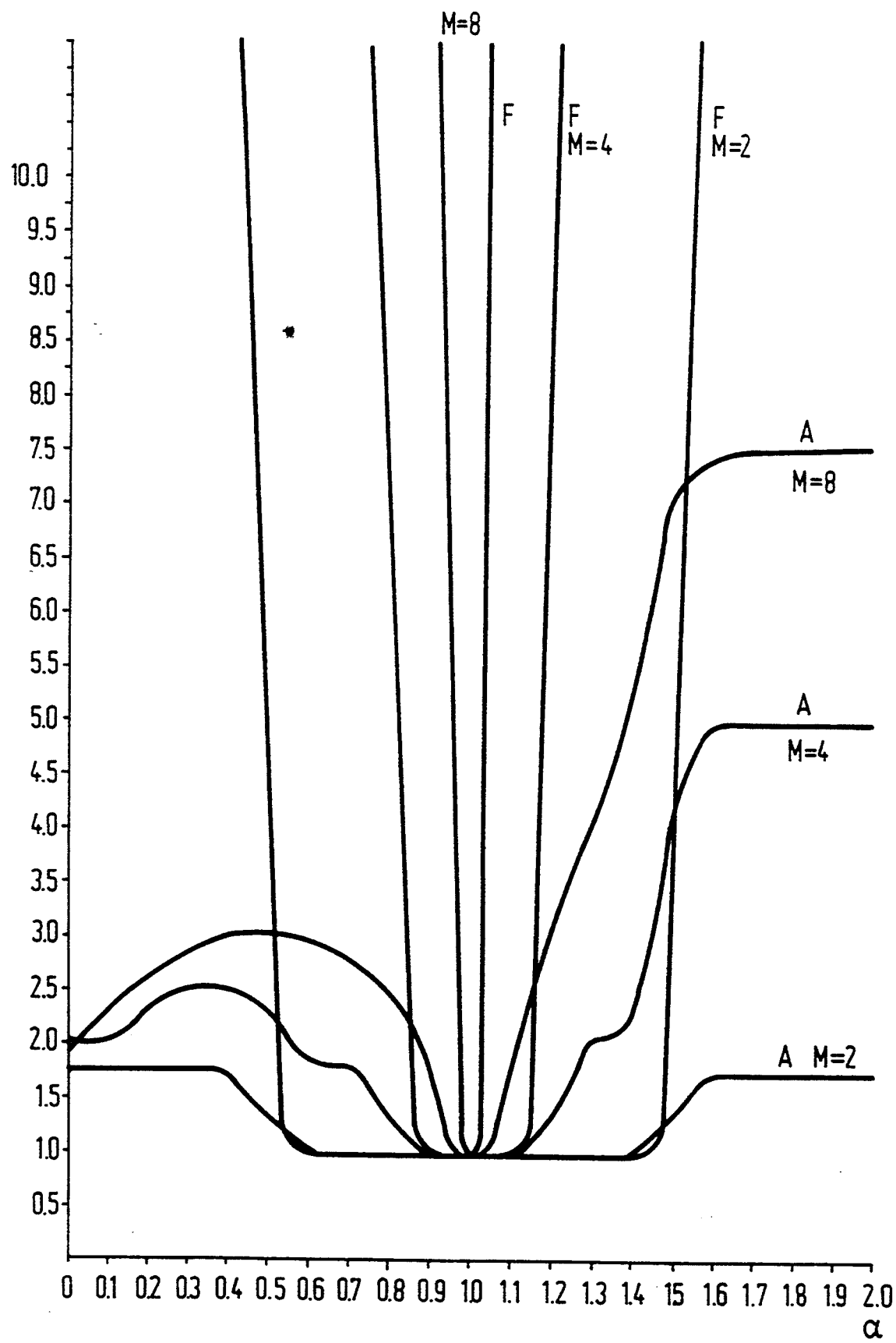
FIG. 4 shows a graph depicting the relative increase of the bit error rate plotted against the deviation of a transmission channel parameter, both in a state-of-the-art transmission system and in a transmission system according to the invention as shown in FIG. 2.

FIG. 4 shows the simulated values of the relative increase of the symbol error rate plotted against $\alpha$, for M=2,4 and 8 both when a state-of-the-art receiver is used (transfer function of fixed filter 18=D) and when a receiver according to the invention as shown in FIG. 2 is used, comprising an adaptive filter 18, which filter has a transfer function equal to $\alpha \cdot D$. The curves referenced F denote the symbol error rate for the state-of-the-art receiver while the curves referenced A denote the error rate for the receiver according to the invention. This drawing figure distinctly shows that when the receiver according to the invention is used the symbol error rate for several $\alpha$ is equal to the symbol error rate when a state-of-the-art receiver is used, but that for most values of $\alpha$ the performance of the receiver according to the invention is considerably better. The difference is most prominent for large values of M.

We claim:

1. Transmission system for transmitting signals from a source to a destination, comprising
   a) a channel, for providing a channel output signal;
   b) a transmitter coupled to the channel, which transmitter includes coding means for converting input symbols into channel symbols;
   c) a receiver coupled to an output of the channel, which receiver includes
      i) subtracter means for determining a difference signal between the channel output signal and a feedback signal,
      ii) quantizing means for obtaining a quantized difference signal from said difference signal,
      iii) filter means for deriving the feedback signal and a feed-forward signal from the quantized difference signal, which filter means includes
         A) a first filter for deriving the feedback signal, which first filter is channel-adaptive, and
         B) a second filter, differing from the first filter, for deriving the feed-forward signal, and
      iv) decoding means for detecting output symbols in the difference signal and the feed-forward signal.

2. Transmission system as claimed in claim 1, characterized in that the number of possible values of the channel symbols is equal to the number of possible values of the input symbols.

3. A receiver comprising
   a) subtracter means for determining a difference signal between an output of a channel and a feedback signal,
   b) quantizing means for for obtaining a quantized difference signal from said difference signal,
   c) filter means for deriving the feedback signal and a feed-forward signal from the quantized difference signal, which filter means includes
      i) a first filter for deriving the feedback signal, which first filter is channel-adaptive, and
      ii) a second filter, differing from the first filter, for deriving the feed-forward signal, and
   d) decoding means for detecting output symbols in the difference signal and the feed-forward signal.

4. The receiver of claim 3
   further comprising further quantizing means for obtaining a further quantized difference signal;

wherein the quantizing means obtains the quantized difference signal from the further quantized difference signal and the decoding means detects the output symbols in the further quantized difference signal and the feed-forward signal.

5. The system of claim 1, wherein the receiver further comprises further quantizing means for forming a further quantized difference signal;

the quantizing means obtains the quantized difference signal from the further quantized difference signal; and the decoding means detects the output symbols in the further quantized difference signal and the feed-forward signal.

6. The receiver of claim 3 wherein the decoding means comprises a modulo-M adder means for obtaining the output symbols by modulo-M addition of a signal that is a measure for the difference signal and a signal that is a measure for the feed-forward signal, where M is a number of different values of channel symbols.

7. The receiver of claim 1 wherein the decoding means comprises a modulo-M adder means for obtaining the output symbols by modulo-M addition of a signal that is a measure for the difference signal and a signal that is a measure for the feed-forward signal, where M is a number of different values of channel symbols.

* * * * *